(12) United States Patent
Winzenz et al.

(10) Patent No.: US 10,254,773 B2
(45) Date of Patent: Apr. 9, 2019

(54) DEVICES, SYSTEMS, AND METHODS FOR BALANCING CLOSELY COUPLED ROTATING MACHINERY

(71) Applicant: LORD Corporation, Cary, NC (US)

(72) Inventors: Wayne L. Winzenz, Raleigh, NC (US); Douglas G. Pedersen, Apex, NC (US); Stephen F. Hildebrand, Apex, NC (US)

(73) Assignee: LORD Corporation, Cary, NC (US)

( * ) Notice: Subject to any disclaimer, the term of this patent is extended or adjusted under 35 U.S.C. 154(b) by 467 days.

(21) Appl. No.: 14/422,430

(22) PCT Filed: Sep. 25, 2013

(86) PCT No.: PCT/US2013/061638
§ 371 (c)(1),
(2) Date: Feb. 19, 2015

(87) PCT Pub. No.: WO2014/052426
PCT Pub. Date: Apr. 3, 2014

(65) Prior Publication Data
US 2015/0234396 A1     Aug. 20, 2015

Related U.S. Application Data

(60) Provisional application No. 61/781,078, filed on Mar. 14, 2013, provisional application No. 61/705,351, filed on Sep. 25, 2012.

(51) Int. Cl.
*G05D 19/02* (2006.01)
*B64C 11/00* (2006.01)
(Continued)

(52) U.S. Cl.
CPC ............ *G05D 19/02* (2013.01); *B64C 11/008* (2013.01); *B64D 31/12* (2013.01); *F16F 15/002* (2013.01);
(Continued)

(58) Field of Classification Search
CPC ....... G05D 19/02; G05B 15/02; F16F 15/002; G01M 1/14; B64D 31/12; B64C 11/008; B60V 1/043
See application file for complete search history.

(56) References Cited

U.S. PATENT DOCUMENTS 5,096,013 A * 3/1992 Yoshida .................. B60V 1/14
180/116
5,469,745 A * 11/1995 Twerdochlib ............ G01H 1/14
73/655
(Continued)

FOREIGN PATENT DOCUMENTS

| EP | 0 834 984 | 4/1998 |
|---|---|---|
| WO | 2008/127362 | 10/2008 |
| WO | WO2014052426 A1 * | 4/2014 ............. F16F 15/00 |

OTHER PUBLICATIONS

Machine translation of Yagi Takeshi, Electronic apparatus and vibration method, Jun. 14, 2012, 14 pages.*
(Continued)

*Primary Examiner* — Thomas C Lee
*Assistant Examiner* — Alan Chu

(57) ABSTRACT

Devices, systems, and related methods for balancing two or more pieces of independently rotating (e.g., not synchrophased) machinery are provided. In some aspects, the devices, systems, and methods can provide improved balancing techniques and can include providing a controller configured to simultaneously measure/receive vibration data and control balancers, one balancer at a time. In some aspects, the controller can calculate a beating cycle or a
(Continued)

beating period using vibration data received from multiple rotating machines. In some aspects, a balance correction command can be derived in part from either one of: (a) an interpolation of an average vibration of the first rotating machine from a complex vibration of the multiple rotating machines or (b) an average vibration derived from one or more rules applied based upon the duration of the beating period or the beating cycle.

24 Claims, 5 Drawing Sheets

(51) Int. Cl.
  *B64D 31/12*  (2006.01)
  *G01M 1/14*  (2006.01)
  *F16F 15/00*  (2006.01)
  *G05B 15/02*  (2006.01)
  *B60V 1/04*  (2006.01)
(52) U.S. Cl.
  CPC ............... *G01M 1/14* (2013.01); *G05B 15/02* (2013.01); *B60V 1/043* (2013.01)

(56) References Cited

U.S. PATENT DOCUMENTS

| | | | |
|---|---|---|---|
| 5,789,678 A * | 8/1998 | Pla ........................ | B64C 11/50 |
| | | | 244/1 N |
| 6,618,646 B1 | 9/2003 | Dyer | |
| 7,533,572 B2 * | 5/2009 | Twerdochlib .......... | G01H 9/006 |
| | | | 356/28.5 |
| 8,639,458 B2 * | 1/2014 | Bechhoefer ........... | B64C 27/008 |
| | | | 244/17.11 |
| 2002/0158180 A1 | 10/2002 | Noell | |
| 2009/0306829 A1 * | 12/2009 | Hildebrand .......... | B64C 11/008 |
| | | | 700/279 |
| 2010/0241010 A1 * | 9/2010 | Lin ......................... | A61B 5/05 |
| | | | 600/484 |
| 2013/0261811 A1 * | 10/2013 | Yagi ........................ | G06F 3/016 |
| | | | 700/280 |

OTHER PUBLICATIONS

Eugin Hyun et al., Method to Improve Range and Velocity Error Using De-interleaving and Frequency Interpolation for Automotive FMCW Radars, Jun. 2009, 12 pages.*

* cited by examiner

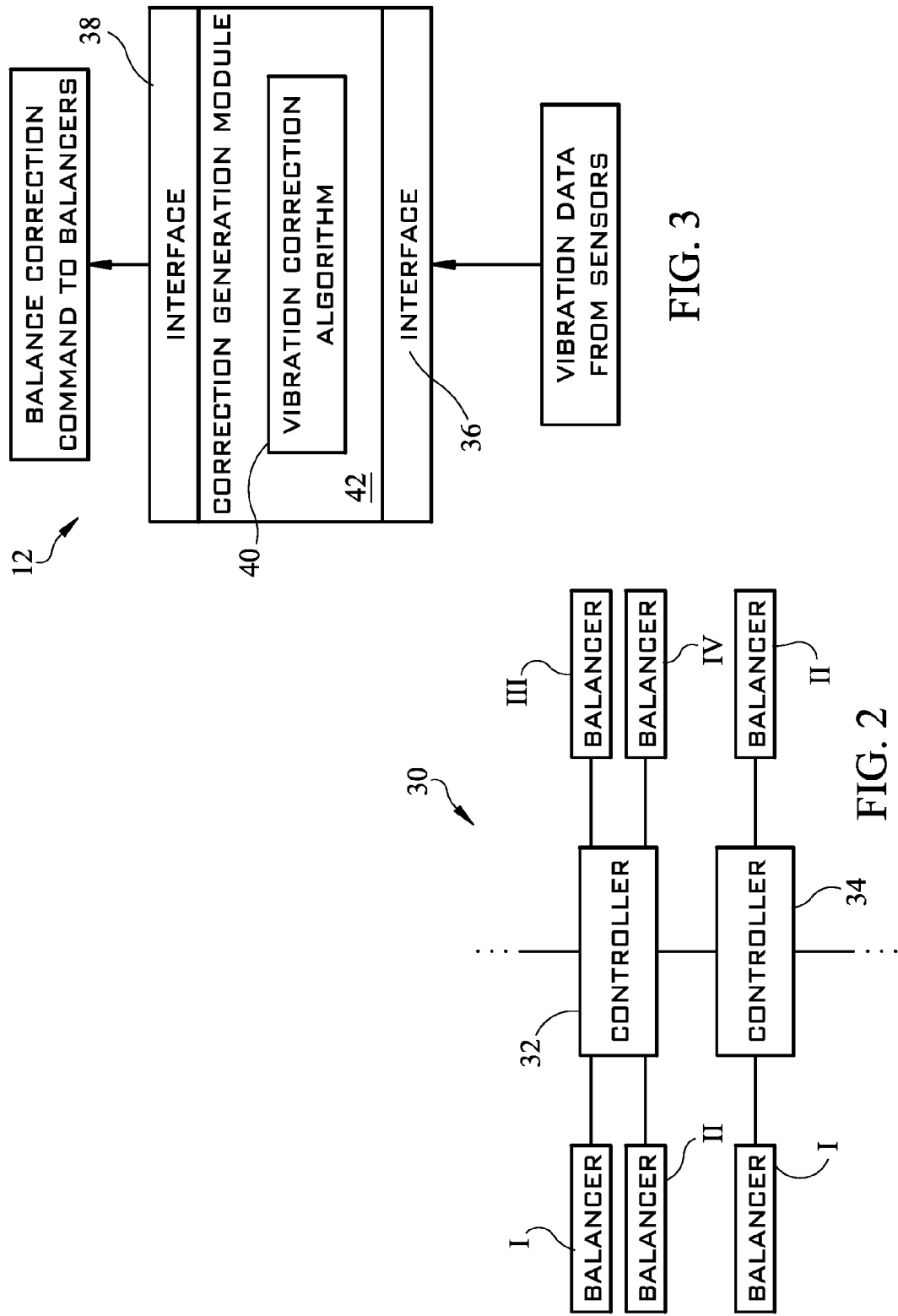

DEVICES, SYSTEMS, AND METHODS FOR BALANCING CLOSELY COUPLED ROTATING MACHINERY

CROSS REFERENCE TO RELATED APPLICATIONS

This application relates and claims priority to U.S. Provisional Patent Application Ser. No. 61/781,078 filed Mar. 14, 2013 and to U.S. Provisional Patent Application Ser. No. 61/705,351 filed Sep. 25, 2012, the disclosure of which are incorporated by reference herein in their entirety.

TECHNICAL FIELD

The subject matter disclosed herein relates generally to devices, systems, and methods for balancing coupled rotating machinery. More particularly, the subject matter disclosed herein relates to devices, systems, and methods for balancing coupled, such as closely coupled and independently rotating machinery by reducing effects of cross-talk, noise, and/or signal beating.

BACKGROUND

Propellers, pumps, lift fans, turbines, generators, compressors, grinders, spindles, drive shafts, machine tools, turbo machinery, and any other types of rotating machinery are susceptible to vibration associated with imbalances within the machine. The vibration, if not corrected, can cause the devices to run inefficiently and ultimately fail.

In some aspects, two or more closely coupled and independently rotating machines (e.g., two or more propellers of an airplane or landing craft, two or more lift fans of a hovercraft, etc.) can be used together. When this happens, vibration from one piece of rotating machinery can be transmitted to the other(s) through the structure, which is known as cross-talk or noise. The cross-talk will not prevent the machinery from being balanced; however, the balance corrections being made on one machine will affect the other. If both machines are balanced at the same time, the controllers cannot distinguish between the vibration changes caused by each balancer. This can result in unnecessary balancing cycles, additional time to balance, and an inability to achieve low vibration levels.

Another problem associated with attempting to balance closely coupled machinery is that when cross-talk occurs, and the machines are operating at similar, but not the same revolutions per minute (RPM), signal beating occurs. If the RPM's are too close for the controllers to discriminate between the vibration frequencies, and the level of beating is significant, the controllers will interpret the vibration signal as rising and falling. Thus, the respective controllers will attempt to balance each piece of equipment, including the rising and falling vibration signal. This also results in unnecessary balancing cycles, additional time to balance, and inability to achieve low vibration levels.

Accordingly, there is a need for improved devices, systems, and methods for balancing closely coupled rotating machinery for improving vibration reducing and increasing service life.

SUMMARY

In one aspect a device for balancing coupled rotating machinery is provided. The device comprises a first interface, a correction generation module and a second interface. The first interface is for receiving vibration information from multiple rotating machines. The correction generation module is adapted to calculate a beating period or a beating cycle from the vibration information received from the multiple rotating machines. The second interface is for sending a balance correction command to a balancer associated with a first rotating machine of the multiple rotating machines. Wherein the balance correction command is derived in part using either one of an interpolation of an average vibration of the first rotating machine obtained in one beating period or less, or an average vibration derived from one or more rules applied based upon the duration of the beating period or the beating cycle.

In another aspect a system for balancing coupled rotating machinery is provided. The system comprises a first piece of rotating machinery, a second piece of rotating machinery and a controller. The first piece of rotating machinery is rotating at a first speed. The second piece of rotating machinery is rotating at a second speed that is different than the first speed, such that together the first and second speeds result in a complex vibration. The controller is configured to determine an average vibration of the first piece of rotating machinery, wherein the controller is configured to interpolate the average vibration of the first piece of rotating machinery from the complex vibration in less than one beating period.

In yet another aspect a method of providing active vibration control within an aircraft is provided. The method comprising the steps of:
(a) receiving vibration data from at least a first rotating machine and a second rotating machine;
(b) comparing the vibration data and determining a duration of a beat cycle:
(c) applying rules based upon the duration of the beat cycle; and
(d) sending a balance correction command to the first rotating machine or the second rotation machine.

In another aspect a method of providing active vibration control within an aircraft is provided. The method comprising the steps of.
(a) receiving vibration data from at least a first rotating machine and a second rotating machine;
(b) determining a beating period from the vibration data;
(c) estimating properties of a demodulated complex vibration during the beating period;
(d) interpolating an average vibration of at least the first or second rotating machine; and
(e) sending a balance correction command to the first rotating machine or the second rotation machine.

In accordance with the disclosure provided herein, novel and improved devices, systems, and methods for balancing closely coupled rotating machinery are provided. Notably, devices, systems, and methods described herein can provide improved vibration correction, in part, by implementing improved algorithms adapted to determine average vibration either by interpolation via demodulated complex vibration or by application of rules based upon the duration of a beat cycle. Thus, balancers and/or balancing systems can provide more effective and efficient balancing. This can improve the performance of and/or reduce maintenance costs associated with replacing closely coupled rotating machinery, or portions thereof.

BRIEF DESCRIPTION OF THE DRAWINGS

A full and enabling disclosure of the present subject matter including the best mode thereof to one of ordinary skill in the art is set forth more particularly in the remainder of the specification, including reference to the accompanying figures, in which:

FIGS. 2 and 3 are block diagrams illustrating various aspects associated with systems and/or devices for balancing closely coupled rotating machinery according to an aspect of the subject matter described herein;

DETAILED DESCRIPTION

Figure 1:
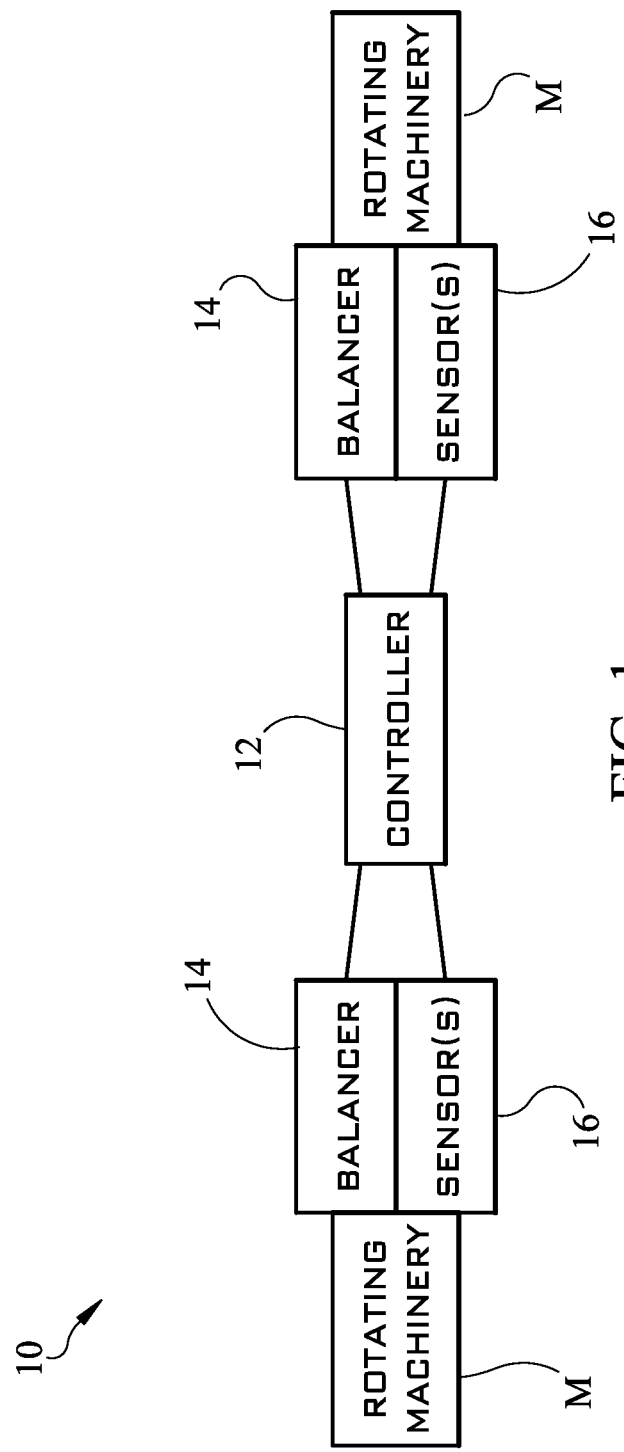
FIG. 1 is a block diagram illustrating a system for balancing closely coupled rotating machinery according to an aspect of the subject matter described herein.

The subject matter disclosed herein is directed to novel devices, systems, and related methods for balancing coupled and independently rotating machinery. In some embodiments, novel devices and systems provided herein can comprise a controller adapted to determine the duration of a beat period or beat cycle between two or more pieces of independently rotating machinery for determining an average vibration associated with a desired piece of rotating machinery.

In some aspects, devices, systems, and methods described herein comprise demodulating a complex vibration signal during a beat cycle for interpolating an average vibration of a desired machine. A beat cycle can be calculated by measuring speeds or frequencies associated with each piece of rotating equipment (e.g., at least two rotating shafts) and comparing the measurements (e.g., see below, Eq. (1)). The average vibration can be used to generate a balance correction command for correcting unbalance in a first machine of multiple rotating machines. An algorithm for interpolating an average vibration using complex vibration demodulation can be repeated for a second, third, etc. pieces of rotating machines, shafts, or equipment.

In some aspects, interpolation of an average vibration used for generation of a balancing command can occur in less than one beating period. This can advantageously improve balancing times, reduce balancing cycles, and provide more efficient and effective balancing. In some aspects, interpolation of an average vibration used for generation of a balancing command can occur in less than one-half of a beating period. In some aspects, interpolation of an average vibration used for generation of a balancing command can occur in less than one-third beating period.

In some aspects, devices, systems, and methods described herein can comprise calculating a beat cycle and applying rules based upon the length or duration of the beat cycle to determine an average vibration associated with a desired machine. In some aspects, if the length of the beat cycle is less than 0.5 seconds (i.e., 2 Hertz (Hz)) normal filtering can separate the signals. In some aspects, if the length of the beat cycle is between approximately 0.5 and 3 seconds (i.e., 2 Hz to 0.33 Hz), the vibration can be measured and averaged for the number of complete beat cycles that can be captured in 3 seconds. In other aspects, if the beat cycle is between approximately 3 and 10 seconds (i.e., 0.33 to 0.10 Hz) vibration over one complete beat cycle can be averaged. If the beat cycle is longer than 10 seconds and if a vibration does not change by more than 10% in 10 seconds, the 10 second average can be used. If the beat cycle is longer than 10 seconds and the vibration does change by more than 10% in 10 seconds, the 10 second average can be used with a 50% alpha ($\alpha$) and a 50% beta ($\beta$) factor of a transfer function, C-matrix, or C-model computing method. Such methods are known and described in commonly assigned U.S. Pat. No. 6,618,646, (See, col. 6, lines 44-48, col. 8, lines 35-42) the disclosure of which is incorporated herein by reference in its entirety.

As used herein, the term "balancing" refers to real time, automatic balance correction (i.e., on-line balancing techniques) in which balancers designed to correct unbalance in rotating machinery monitor rotating imbalance and provide real start-up and shut-down cycles. Balancing can be performed using permanently installed balancers to reduce maintenance cost and improve performance.

As used herein, the terms "cross-talk" and "noise" refer to an effect where vibration from one piece of rotating machinery is transmitted to another piece (or multiple pieces) of rotating machinery through a structure (e.g., a same mounting structure, component structure, etc.).

As used herein, the terms "beating", "signal beating", and/or "beating signal" refer to an effect that occurs when two or more pieces of rotating machinery experience crosstalk, and are operating at near but not the same revolution per minute (RPM). In some aspects, cross-talk and signal beating produce undesirable effects which can be mitigated by balancing the piece of equipment with the highest vibration level first. When implemented in conjunction with other control strategies (e.g., filtering, interpolating, and/or averaging vibration per rule application as described herein) can improve balancing of multiple machines, shafts, or equipment by making it more efficient and/or effective.

As used herein, the terms "beat cycle" and "beat period" refer to one cycle or period of a beat frequency. When two pieces of machinery experience beating, because the frequencies of operation for each piece of rotating machinery are slightly different, the peaks and valleys of the vibration constantly change relative to one-another, sometimes augmenting each other and sometimes canceling each other. The frequency of the beat and/or the beat period is the difference between the operating frequencies. If the frequencies are too close for the controller to discriminate between them, and the level of beating is large, the controller will interpret the vibration signal as rising and falling. Two novel methods of mitigating problems and noise caused by beating include (i) determining a beat cycle and applying rules and (ii) interpolating an average vibration of a desired machine or shaft as described herein.

The subject matter described herein can be at least partially implemented via software in combination with hardware and/or firmware. For example, the subject matter described herein can be implemented in software executed by a processor (e.g., a hardware-based processor) of a controller. In one exemplary implementation, the subject matter described herein can be implemented via a controller including a non-transitory computer readable medium having stored thereon computer executable instructions that when executed by the processor of a computer does control the computer to perform steps. Exemplary computer readable media suitable for implementing the subject matter described herein include non-transitory devices, such as disk memory devices, chip memory devices, programmable logic devices, such as field programmable gate arrays, and application specific integrated circuits. In addition, a computer readable medium that implements the subject matter described herein may be located on a single device or computing platform or may be distributed across multiple devices or computing platforms.

As used herein, the terms "controller" and "module" refer to software in combination with hardware and/or firmware for implementing features described herein. In some embodiments, a controller may include a memory, a processor, field-programmable gateway array, and/or an application-specific integrated circuit.

As used herein, the terms "vibration information" and "vibration data" are synonymous and refer to pulses and/or rotational events measured by sensors, such as, for example only and not limited to accelerometers, velocity transducers, proximity probes, etc. In some aspects, such data can be output as a complex voltage waveform. In some aspects, the terms also refer to information measured via tachometers, such as Hall sensors, which can provide revolutions per minute (RPM) reference data used to calculate vibration at once per revolution. The terms above can refer to any measured, detected, collected, or sensed data useful for determining vibration frequencies, RPMs, periods, cycles, and/or phase angles at which vibrations associated with rotating machinery and/or balancers are occurring.

Reference will be made in detail to possible aspects or embodiments of the subject matter herein, one or more examples of which are shown in the figures. Each example is provided to explain the subject matter and not as a limitation. In fact, features illustrated or described as part of one embodiment can be used in another embodiment to yield still a further embodiment. It is intended that the subject matter disclosed and envisioned herein covers such modifications and variations.

As illustrated in the various figures, some sizes of structures or portions are exaggerated relative to other structures or portions for illustrative purposes and, thus, are provided to illustrate the general structures of the present subject matter. Furthermore, various aspects of the present subject matter are described with reference to a structure or a portion being formed on other structures, portions, or both. As will be appreciated by those of skill in the art, references to a structure being formed "on" or "above" another structure or portion contemplates that additional structure, portion, or both may intervene. References to a structure or a portion being formed "on" another structure or portion without an intervening structure or portion are described herein as being formed "directly on" the structure or portion. Similarly, it will be understood that when an element is referred to as being "connected", "attached", or "coupled" to another element, it can be directly connected, attached, or coupled to the other element, or intervening elements may be present. In contrast, when an element is referred to as being "directly connected", "directly attached", or "directly coupled" to another element, no intervening elements are present.

Furthermore, relative terms such as "on", "above", "upper", "top", "lower", or "bottom" used herein describe one structure's or portion's relationship to another structure or portion as illustrated in the figures. It will be understood that relative terms such as "on", "above", "upper", "top", "lower or "bottom" are intended to encompass different orientations of the component in addition to the orientation depicted in the figures. For example, if a component or feature in the figures is turned over, structure or portion described as "above" other structures or portions would now be oriented "below" the other structures or portions. Likewise, if components in the figures are rotated along an axis, structure or portion described as "above", other structures or portions would be oriented "next to" or "left of" the other structures or portions. Like numbers refer to like elements throughout.

Unless the absence of one or more elements is specifically recited, the terms "comprising", including", and "having" as used herein should be interpreted as open-ended terms that do not preclude the presence of one or more elements.

Embodiments of the subject matter herein are described herein with reference to cross-sectional, perspective, elevational, and/or plan view illustrations that are schematic illustrations of idealized embodiments of the subject matter herein. Variations from the shapes of the illustrations as a result, for example, of manufacturing techniques and/or tolerances, are to be expected, such that embodiments of the subject matter herein should not be construed as limited to particular shapes illustrated herein. The subject matter herein may be embodied in different forms and should not be construed as limited to the specific embodiments set forth herein. In the drawings, the size and relative sizes of different portions and/or regions may be exaggerated for clarity. Various illustrative features are described below in connection with the accompanying figures.

FIGS. 1 to 6 illustrate various views and/or features associated with devices, systems, and related methods for balancing (i.e., correcting unbalance in) two or more pieces of closely coupled and independently rotating machinery, namely, two or more propellers, fans, pumps, centrifuges, oil-field equipment, electrical power plant equipment, turbines, generators, compressors, lathes, drive shafts, fluid/flow systems, spindles, and/or any other type of rotating machinery including a rotating portion such as a rotating shaft. In some aspects, balancing devices, systems, and related methods described herein can be adapted for use in hovercrafts which utilize a combination of propellers and lift fans.

FIG. 1 illustrates a system 10 for balancing (i.e., correcting unbalance) in multiple coupled, such as closely coupled, pieces of independently rotating shafts or machinery, generally designated M. That is, system 10 can be adapted to mitigate vibration associated with one or more pieces of independently rotating machinery (i.e., uncoupled, unsynchronized, not synchrophased rotation) which may otherwise be difficult to balance due to cross-talk, noise, and signal beating which occurs during operation of closely coupled, independently rotating machines. System 10 can comprise at least one device adapted to balance multiple pieces of rotating machinery M. For example in one aspect, a device adapted to balance multiple pieces of rotating machinery can comprise a controller 12. In some aspects, controller 12 can be adapted to measure vibration associated with the multiple pieces of rotating machinery M as well as simultaneously control multiple balancers 14.

In some aspects, controller 12 can receive vibration measurements directly from one or more sensors 16 associated with multiple machines, calculate an average vibration of a given machine, calculate corrections to be made per machine, and transmit pulses to coils of one or more balancers 14 to move rotors into command positions for correcting unbalance. One or more balancers 14 and sensors 16 can be associated with respective pieces of machinery M. That is, a first balancer 14 and a first sensor 16 can be associated with a first piece of machinery M, and a second balancer 14 and a second sensor 16 can be associated with a second piece of machinery M. Third, fourth, etc. balancers 14 and sensors 16 can be associated with third, fourth, etc., respective pieces of machinery M.

Notably, if one piece of machinery M has a higher level of vibration than another piece of equipment, the piece of equipment having the highest vibration can be balanced first. However, if vibration readings obtained at each piece of machinery M are about the same, logic applied and processed at controller 12 can be used to establish balancer priority, such as balancing starboard equipment or machinery M first.

In some aspects, controller 12 can implement improved balancing as described herein via software in combination with hardware and/or firmware. For example, improved balancing systems, devices, and methods can be implemented in software executed by a processor of controller 12. In some aspects, controller 12 can comprise an algorithm for calculating a balance correction command or signal which can counteract (e.g., cancel, reduce, or mitigate) vibration from machinery M, thereby improving operability, performance, and lifetime of machinery M.

In some aspects, controller 12 can be adapted to measure vibration detected or transmitted by sensors 16 simultaneously on four channels and control balancers 14 on four channels, one balancer at a time. In some aspects, controller 12 is capable of at least 5 amp (A) current pulses and up to approximately 20 A current pulses. In some aspects, controller 12 can be operable at approximately 115 volts (V) or more, approximately 230 V AC or more, and between approximately 50 to 60 Hz, or up to approximately 400 Hz. In some aspects, influence between balancers can, but does not have to be calculated. FIG. 2 and Table 1, each described below, illustrate further aspects associated with controllers described herein.

In some aspects, balancers 14 and/or balancing systems, for example such as those described in commonly assigned U.S. Pat. No. 8,360,728, can be provided, the disclosure of which has been fully incorporated by reference herein. In some aspects, balancers 14 can comprise a rotor assembly which rotates with machinery M and at least one counterweight having an adjustable position relative to machinery M for balancing the machinery in real time. Balancers 14 can further comprise a coil assembly adapted to receive pulses or signals from controller 12 for changing the position of a counterweight to obtain a desired balancing solution at or below a predetermined vibration threshold level.

In some aspects, sensors 16 can comprise accelerometers, tachometers, and/or combinations thereof coupled to portions of machinery M and/or balancers 14. Sensors 16 can comprise signaling interfaces adapted to send vibration and/or positioning measurements to controller 12 for analysis. In some aspects, controller 12 can be adapted to receive vibration information from multiple sensors 16 associated with multiple pieces of rotating machinery M, compare the vibration information, and calculate a beat period or a beat cycle based upon the vibration information.

In some aspects, sensors 16 can comprise vibration sensors or accelerometers adapted to provide a vibration signal to controller 12, and allow for processing the level of unbalance in the respective machinery M. For example, in some aspects, sensors 16 can comprise at least one accelerometer configured to measure the vibration, or acceleration of motion associated with machinery M. Broad spectrum vibration can be measured via accelerometers mounted at or near the bearing housing and balancer locations. In some aspects, sensors 16 can comprise accelerometers adapted to output information as a complex voltage waveform that reflects acceleration in g-force (i.e., g's or g). In some aspects, accelerometers can output approximately 100 millivolts/g-force (mV/g) or more, approximately 200 mV/g or more, up to a maximum value.

In some aspects, sensors 16 can further comprise positioning sensors or tachometers adapted to emit tachometer signals provided by Hall sensors. Hall sensors can be provided proximate a portion of the respective balancer 14. In some aspects, Hall sensors can be stationary with respect to the rotating machinery and can transmit signals indicative of RPM and position data with respect to a rotating shaft of machinery M and the counterweight of balancer. Such signals can be transmitted to controller 12. In some aspects, a signal generated by the tachometer can comprise a reference signal for determining RPM and also for providing the position reference for determining the phase angle at which vibration is occurring. This can help determine where to position counterweights for vibration reduction. Additional sensors can be used detect the passing of target magnets positioned at various vector angles, where desired.

In some aspects, controller 12 can be configured to and can use and/or provide filters, amplifiers, and/or one or more algorithms for processing signals received from sensors 16 to isolate the vibration occurring at the frequency of the tachometer signal. The processed vibration signals can be roughly sinusoidal in shape. The difference in the positive and negative peaks of the waveform can allow controller 12 to determine a magnitude of the vibration. Magnitude can be converted internally from acceleration to velocity or displacement. The lag of the zero crossing of the vibration waveform from the tachometer signal can allow controller 12 to establish a phase angle of the vibration. The lag of the rotor position signals from the tachometer signal can allow controller 12 to determine the angular position and the amount of correction the balancers are making or should make, if any.

FIG. 2 is a block diagram illustrating a system of devices for balancing more than one piece of rotating machinery which are subject to cross-talk, noise, and/or signal beating, generally designated 30. In some aspects, system 30 can comprise multiple devices or multiple controllers configured to communicate directly with each other. In some aspects, connectivity between controllers can prevent balancers coupled thereto from operating at a same time, which can advantageously improve efficiency and effectiveness of system 30. That is, balance corrections made at one controller can affect corrections at another controller. Having both controllers balance at a same time can result in unnecessary balancing cycles and additional time to balance. Accordingly, controllers can communicate and/or include logic for balancing according to a predetermined priority. In other aspects, controllers can communicate and/or include logic for balancing machinery having a highest level of vibration first and a lowest level of vibration last.

In some aspects, a first controller 32 can control up to four balancers numbered I to IV. In some aspects, a second controller 34 can control up to two balancers, numbered I and II. Controllers described herein can be operable in different modes, for example, as described in Table 1 below.

TABLE 1

Controller Modes

| Number/Type of Channels | Description |
| --- | --- |
| Four 1 × 1 Channels | Controls up to 4 balancers, each of which can be controlled by the output of a vibration transducer (i.e. coil or coil assembly) mounted near each balancer. |
| Two 1 × 2 Channels | Controls up to 2 balancers, each of which can be controlled by the simultaneous output of 2 vibration transducers mounted at a 90° angle with respect to each other near each balancer. |
| Two 2 × 2 Channels | Controls up to 4 balancers, each pair of which can be controlled by the simultaneous output of a pair of vibration transducers, one mounted near each balancer. |
| One 4 × 4 Channels | Controls up to 4 balancers, all of which can be controlled by the simultaneous output of up to all 4 vibration transducers, one mounted near each balancer. |

FIG. 3 is a block diagram of a device, such as controller generally designated 12 (FIG. 1) for balancing closely coupled independently rotating machinery according to one aspect of the subject matter described herein. In some aspects, controller 12 can simultaneously process the vibration data received from one or more sensors (16, FIG. 1) and balance multiple balancers, one at a time. In some aspects, controller 12 can output a balance correction command or signal to one or more balancers 14. In some aspects, controller 12 can send correction signals for pulsing a coil or coil assembly of each balancer 14 (FIG. 1). The pulsing received at the coil assembly of balancer 14 can be used to reposition one or more counterweights for cancelling vibration associated with the respective piece of rotating machinery M (FIG. 1). In some aspects, controller 12 can continually monitor and adjust the balancing corrections in real time as needed.

As FIG. 3 illustrates, controller 12 can comprise multiple interfaces, including at least a first interface 36 and a second interface 38. First and second interfaces 36 and 38 can comprise physical and/or electrical interfaces configured for sending and receiving information. In some aspects, first and second interfaces 36 and 38 comprise signaling interfaces or serial communication ports, which can be used for exchanging information between multiple sensors and up to four balancers.

In some aspects, first interface 36 can be configured to receive as input vibration information from multiple sensors (e.g., 16, FIG. 1) associated with multiple balancer and rotating machinery M (FIG. 1) pairs. Notably, the vibration information received at controller 12 can be input within a vibration correction algorithm 40 of a correction generation module 42. The information can be used to calculate a beating signal based upon input from sensors associated with at least two independently rotating machines. The period or cycle of the beating signal can be used to derive, calculate, and/or interpolate an average vibration associated with each piece of rotating machinery. That is, algorithm 40 can estimate the complex vibration associated with one machine that is being vibrated by another machine (e.g., beating).

In some aspects, correction generation module 42 can generate and output a balance correction command or signal to each balancer, one at a time, for reducing and/or mitigating the average vibration or unbalance associated with each respective machine M (FIG. 1) based upon the beating period. The correction command can be received by each balancer, which can reposition one or more counterweights in response to the balancing correction command for mitigating vibration. In some aspects, the machine with the highest vibration can be corrected first, and machines can be corrected in successive order until the machine with the lowest vibration can be corrected last. In other aspects, machines can be balanced per logic contained at controller 12 and/or according to logic at more than one controller (e.g., FIG. 2). Balancing systems described herein can provide real-time or online balancing, and can continue to monitor and correct vibration as needed.

Figures 4A, 4B:
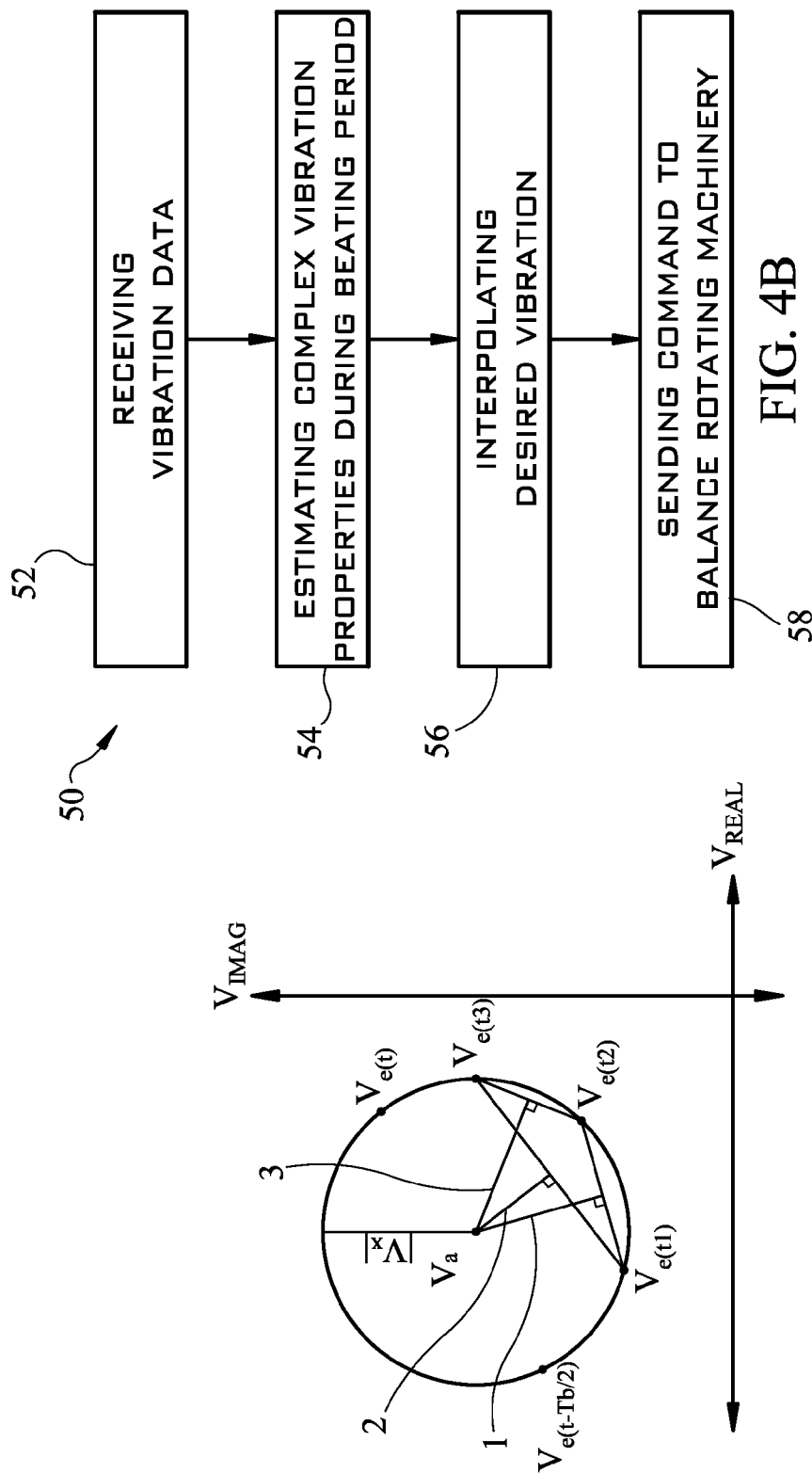
FIG. 4A is a graphical illustration of a method or algorithm of interpolating an average vibration of a desired rotating machine via complex demodulated vibration properties of a beating signal for use in a balancing system according to an aspect of the subject matter described herein.
FIG. 4B is a flow chart illustrating exemplary steps for balancing closely coupled rotating machinery via complex demodulated vibration properties illustrated in FIG. 4A according to an aspect of the subject matter described herein.

In some aspects as described further with respect to FIGS. 4A and 4B, correction generation module 42 (FIG. 3) can comprise a vibration correction algorithm 40 for calculating a correction based upon beating or beating signals. When two pieces of machinery or shafts rotate at similar, but not identical, speeds, online balancing of one piece of machinery/shaft can be compromised by another machine or shaft's vibration, and is called beating. In some aspects, vibration correction algorithm 40 can comprise an algorithm which estimates demodulated complex vibration properties of a beating signal to reduce the averaging required to significantly less than one beating period. That is, rather than averaging vibration over an integer number of beating periods (e.g., beat cycles), vibration correction algorithm 40 can be configured to estimate or interpolate an average vibration associated with a given machine in significantly less than one beating period. This can advantageously reduce time to balance and reduce the number of balancing cycles.

Figure 5:
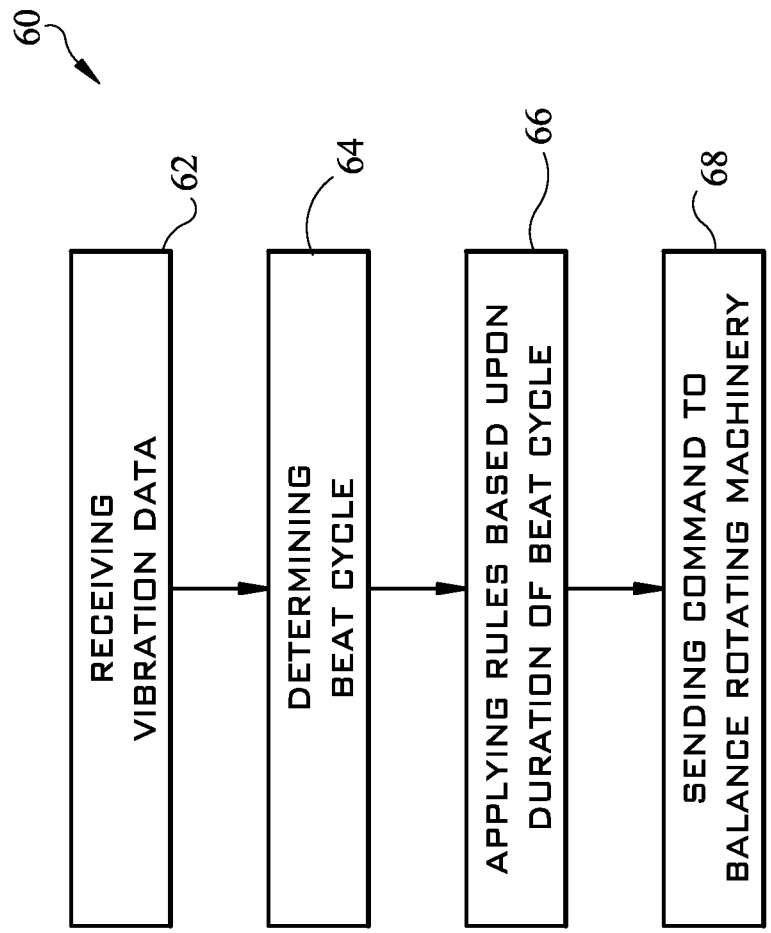
FIG. 5 is a flow chart illustrating exemplary steps for balancing closely coupled rotating machinery via averaging vibration as a function of time per beat cycle according to one aspect of the subject matter described herein.

In other aspects, control algorithm 40 can comprise an algorithm which averages vibration as a function of time per beat cycle, and applies rules based upon the duration of the beat cycle as further described in FIG. 5.

FIG. 4A is a graphical illustration of a method and/or algorithm that can be used and applied by correction generation module (42, FIG. 3) of controller 12. The method and/or algorithm can interpolate an average vibration of a piece of rotating machinery via estimating complex demodulated vibration properties of a beating signal. In some aspects, the interpolated average vibration can be used for providing vibration control and/or for correcting unbalance in rotating machinery via a balancer and/or balancing system according to aspects of the subject matter described herein. In some aspects, the average vibration may be difficult to estimate because of noise and/or interference from other rotating machines. Notably, devices, systems, and methods described herein can eliminate interference from other machines via quick interpolation. FIG. 4B is a flow chart illustrating exemplary steps for balancing closely coupled rotating machinery via estimation of complex demodulated vibration properties described in FIG. 4A according to one aspect of the subject matter described herein.

FIG. 4A is a graphical illustration of a complex vibration (Ve) caused by machinery having an average vibration (Va) that is also being vibrated an amount (Vx) by another piece of machinery at nearly an identical frequency. In some aspects, isolation of the average vibration Va of machinery having the highest vibration is desired, that is, vibration or interference in the amount Vx should be eliminated before the desired machine can be balanced. Notably, vibration correction algorithm (40, FIG. 3) can utilize complex demodulated vibration properties of the beating signal to reduce averaging required to significantly less than one beating period. This can advantageously significantly reduce balancing times, prevent unnecessary balancing cycles, and provide more effective balancing. The complex demodulated vibration properties can be used to isolate and/or interpolate the desired average vibration (Va) of each machine to be balanced.

As FIG. 4A illustrates and in a stable system, complex vibration can be demodulated at controller (e.g., via algorithm 40, FIG. 3) into real and imaginary parts along an imaginary axis $V_{IMAG}$ and a real axis $V_{REAL}$. The estimate of complex vibration Ve in the complex plane comprises a circle centered at the desired average vibration Va and a radius of the magnitude of amount Vx (e.g., interference from another machine). The complex vibration will "orbit" (e.g., along the circle) the point of average vibration Va once per beating period as illustrated by the circle about point Va in FIG. 4A. The beating period can be calculated according to Equation (1) below:

$$Tb=1/(Fa-Fx) \qquad \text{Eq. (1):}$$

Equation 1 is a calculation which can be performed at controller (12, FIG. 3) for one beating period Tb, where Fa and Fx are the frequencies at which the machinery having an average vibration Va and the machinery vibrating by amount Vx are vibrating, respectively. The frequencies of vibration can be measured or obtained via information received from sensors (16, FIG. 1). Averaging the complex vibration Ve over one beating period Tb will eliminate the interference or noise from Vx.

Equation (2) below can eliminate the interference from Vx in only half the beating time Tb (e.g., less than 1 beating period).

$$Va=[Ve(t)+Ve(t-Tb/2)]/2 \qquad \text{Eq. (2):}$$

In other aspects, the magnitude of interference from Vx can be estimated in half the beating time as illustrated by Equation (3) below:

$$|Vx|=[Ve(t)-Ve(t-Tb/2)]/2 \qquad \text{Eq. (3):}$$

The values Ve(t) and Ve(t−Tb/2) are illustrated in FIG. 4A and lie across from each other across a diameter of the circle. Thus, dividing the sum and/or difference of these values by two allows interpolation of average vibration Va by sampling two points on the circle.

For a quicker estimation of the magnitude of interference by amount Vx, two estimates can be taken over a time of less than Tb/2. That is, estimates can be taken at Ve(t1) and Ve(t2). The value of the magnitude of interference can be estimated by Equation (4) below:

$$|Vx|=(TbVe(t1)-Ve(t2))/2 \sin(\pi(t1-t2)/Tb) \qquad \text{Eq. (4):}$$

For even quicker elimination of interference, three estimates can be taken over a time of less than Tb/2. In some aspects, estimates can be taken at Ve(t1), Ve(t2), and Ve(t3) shown in FIG. 4A. The desired vibration of the machine vibrating at an average vibration Va can be estimated at the intersection of the perpendicular bisectors (denoted 1 to 3) of lines connecting these points. In some aspects, to reduce the effects of other noises more than three points can be measured and a least squares fit to the solution of the circle's center can be computed. Controller 12, specifically algorithm (40, FIG. 3), can be configured to perform demodulation and interpolations via equations and/or information described herein. The average vibration derived via interpolation can be used to cancel vibration at the desired machine via positioning counterweight per command signal output from controller (12, FIG. 3).

In some aspects, interpolation of the average vibration Va per machine, which is used for generation of a balancing command, can occur in less than one beating period Tb (e.g., Tb/2). This can advantageously improve balancing times, reduce balancing cycles, and provide more efficient and effective balancing. In some aspects, interpolation of an average vibration used for generation of a balancing command can occur in less than one-half of a beating period (e.g., less than Tb/2). In some aspects, interpolation of an average vibration used for generation of a balancing command can occur in less than one-third of the beating period (e.g., less than Tb/3).

FIG. 4B is a flow chart illustrating, without limitation, exemplary steps 50 for balancing at least a first machine of multiple closely coupled and independently rotating machines according to one aspect of the subject matter described herein. In some aspects, balancing the first machine and each successive machine can be achieved using a device, such as a controller. The controller can be configured to receive data from multiple sensors, compare the data, and calculate a balance correction command for balancing each machine one at a time. The controller can continually monitor and balance multiple machines in real time.

In block 52, vibration data can be received. In some aspects, vibration data can include information or signals received from one or more sensors (e.g., accelerometers and/or tachometers). Vibration information can comprise a vibration frequency, speed, or information used to calculate RPM and phase angle data of vibration. In some aspects, vibration data received at controller from multiple sensors can be demodulated into real and imaginary components (e.g., FIG. 4A). In some aspects and as previously described, the controller can be configured to receive information from sensor across a port or interface.

In block 54, complex vibration properties can be estimated during one beating period. In some aspects, the beating period (Tb, FIG. 4A) can be calculated according to Equation (1), above using information received from a controller, for example, from one or more sensors. In some aspects, complex vibration properties can be estimated by demodulating the complex vibration into real and imaginary parts.

In block 56, the desired vibration can be interpolated. In some aspects, the desired vibration can comprise an average vibration (e.g., Va, FIG. 4A) of a desired machine. The average vibration can be difficult to isolate and/or calculate otherwise without the novel interpolation via demodulated complex vibration described herein, as noise (e.g., of magnitude Vx, FIG. 4) from other machines can interfere with the desired vibration. Such noise can be filtered out. The desired vibration (e.g., Va, FIG. 4A) can be interpolated by estimating complex vibration at two points, three points, or more than three points. In some aspects, the desired vibration can be interpolated by calculating the intersection of the perpendicular bisectors of lines connecting such points. In some aspects, the desired vibration can be interpolated in less than one beating period or less than one-half of a beating period.

In block 58, the controller can generate and send a balance correction command for canceling and/or counteracting the interpolated average vibration (Va, FIG. 4A) of the desired or targeted machine. In some aspects the balance correction command can be received at a balancer associated with the targeted machine. The balancer can position a counterweight according to the balance correction command to counteract vibration. Notably, in some aspects the machine having the highest vibration can be balanced first. This can provide more accurate and improved vibration control. The remaining machines can be balanced via steps 50 as desired.

FIG. 5 is a flow chart illustrating, without limitation, exemplary steps 60 for balancing at least a first machine of multiple closely coupled and independently rotating machines. As described in FIG. 3, in some aspects, a device for balancing machines can comprise a vibration correction algorithm (e.g., 40, FIG. 3) which can average vibration as a function of time per beat cycle, and apply rules based upon the duration of the beat cycle. In some aspects, vibration data collection and/or reception involve C-matrix, or C-model computing methodology. Such methods are known and described in commonly assigned U.S. Pat. No. 6,618,646, the disclosure which has been fully incorporated by reference hereinabove.

In block 62, vibration data can be received. In some aspects, vibration data can include information or signals received from one or more sensors (e.g., accelerometers and/or tachometers). Vibration information can comprise a vibration frequency, speed, information used to calculate RPM and/or phase angle data of vibration.

In some aspects, prior to block 62, running speeds of the shafts of rotating machinery can be intentionally driven beyond the limits of the frequency resolution for the duration of the C-model data collection stage to ensure valid plant model data is collected for each shaft separately. Then the rotation speeds can be monitored and recorded during normal operation thereby ensuring the C-model is not corrupted when the adjoining shaft speeds are not able to be resolved. In some aspects, a collective set of shafts are monitored.

In block 64, a beat cycle can be determined. In some aspects, the beat cycle is the beat period (Tb, FIG. 4A), which can be calculated according to Equation (1), above using information received from at controller, for example, from one or more sensors. In other aspects, the speed of at least two rotating machines with tachometers can be received and compared to determine the length of a beat cycle.

In block 66, rules can be applied based upon the duration of the beat cycle. Table 2 below includes various rules that controller (12, FIG. 3) can apply based upon the duration of the beat cycle.

TABLE 2

Exemplary Rules

| Rule No. | Beat Cycle | Rule |
| --- | --- | --- |
| 1 | A length less than approximately 0.5 seconds (i.e., approximately 2 Hz). | Allow for normal filtering to separate the signals. |
| 2 | A length between approximately 0.5 and 3 seconds (i.e., approximately 2 Hz to 0.10 Hz). | Measure the vibration and average the vibration over a number of complete beat cycles that can be captured in 3 seconds. Example: Where a beat cycle is 0.7 seconds, the measured vibration data can be averaged over 2.1 seconds, thereby capturing 3 complete beat cycles in less than 3 seconds. |
| 3 | A length between approximately 3 and 10 seconds (i.e., approximately 0.10 Hz to 0.033 Hz). | Vibration measurements over one complete beat cycle will be averaged. |
| 4a | A length longer than approximately 10 seconds, where the vibration does not change more than 10% in 10 seconds. | The 10 second average will be used. |
| 4b | A length longer than approximately 10 seconds, where the vibration does change more than 10% in 10 seconds. | The 10-second average will be used with a 50% alpha (α) and a 50% beta (β) factor. |

Upon application of rules similar to those found in Table 2 above, an average vibration can be calculated based upon averaging vibrations measured over one or more beat cycles and/or durations thereof. In block 68, a controller can generate and send a balance correction command for canceling and/or counteracting the average vibration of the desired or targeted rotating machine. The balancer can thus correct unbalance caused by the estimated average vibration of the machine. In some aspects the balance correction command can be received at a balancer associated with the targeted machine. The balancer can position a counterweight according to the command to counteract vibration. Notably, in some aspects the machine having the highest vibration can be balanced first. This can provide more accurate and improved vibration control. The remaining machines can be balanced via steps 60 as desired.

With respect to Rule 4b in Table 2 above, as known to those having skill in the art, α and β are factors or parameters used in the current control technology to produce better control stability. In some aspects, an a parameter can be used to set how aggressively a controller seeks to make balance correctors. For example, the α parameter can comprise a factor that can be 1.0 or below and which can be multiplied by the magnitude portion of the influence coefficient in the C-model to reduce the correction response of the C-model. The C-model methodology can be found, for example, in commonly assigned U.S. Pat. No. 6,618,646 which has been fully incorporated by reference hereinabove. In one aspect, an a parameter of 0.5 can result in the correction algorithm making corrections at a one-half of the rate it would with a value of 1.0. This means the control can slowly approach an optimal solution rather than trying to achieve the optimal solution in one correction. Values between 0.5 and 1.0 will attempt to achieve an optimal solution more aggressively, while values below 0.5 will attempt to achieve an optimal solution more slowly.

The β parameter can be used to set how aggressively new influence coefficient data is used to replace old data. The β factor can also be 1.0 or below, and can indicate a ratio applied to replacing stored C-model data with new C-model data. A β factor having a value of 1.0 would completely replace the stored C-model data with a new C-model based on the most recent correction made. A β factor value of 0.5 would average the data from the old C-model and the new C-model. In some aspects, β factor values of between 0.5 and 1.0 weight the new data proportionately higher. Beta factor values from 0.5 and below weight the stored values proportionately higher.

In some aspects, using both α and β factor values results in a substantial increase in the control stability, especially when attempting to achieve low vibration levels in the presence of noise.

In alternative aspects, a minimal averaging time immediately before and after step changes in rotation speed of machines so that the before/after measurements for influence coefficients are as close together as possible in the long beating cycle provides improved performance. In this alternative, the trip level measurement should be a long average. Tracking the beat frequency over the entire sampling period may also be performed, to assure minimal variation.

Figure 6:
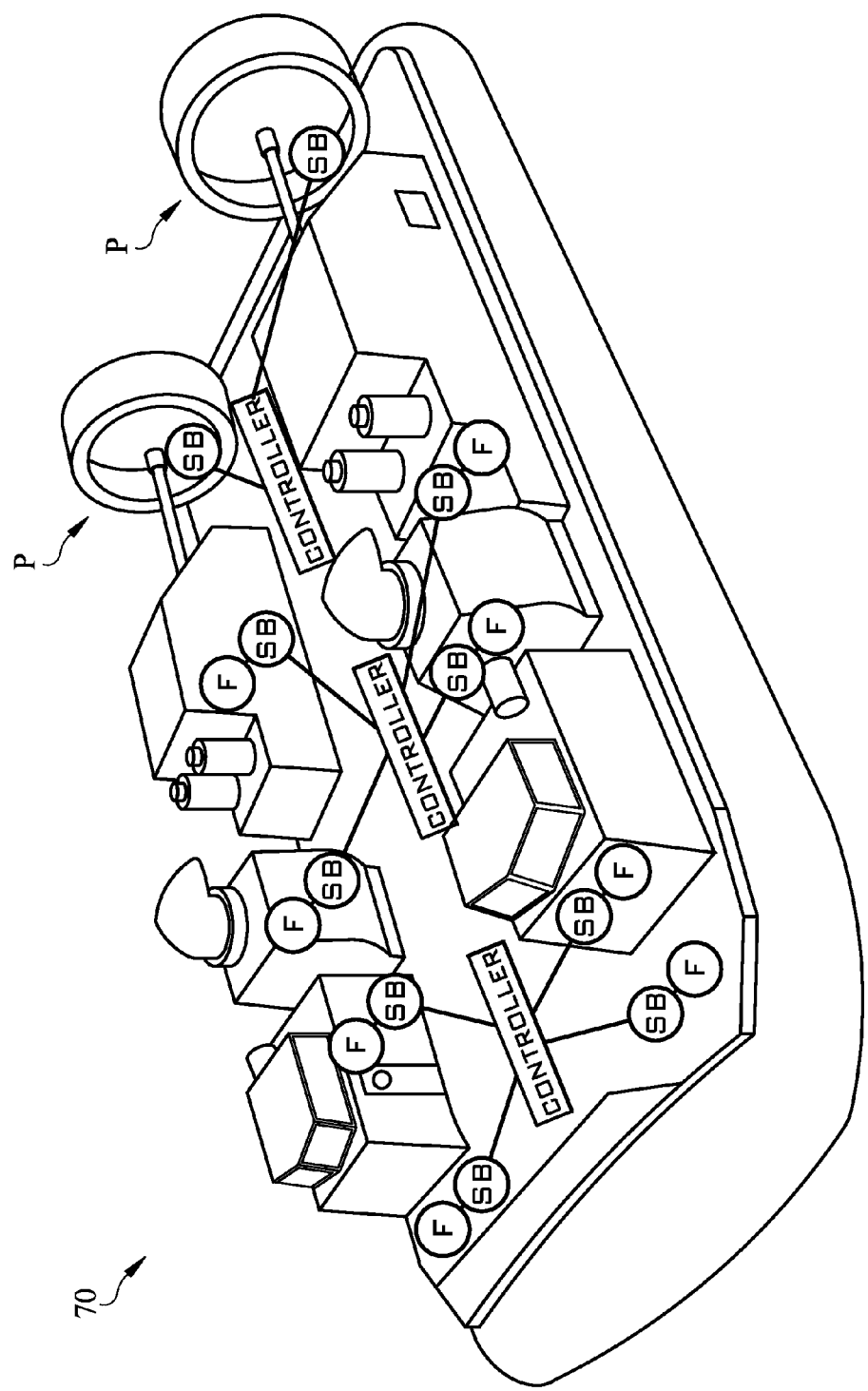
FIG. 6 is a schematic diagram of a hovercraft having closely coupled and independently rotating machinery and balancing systems according to an aspect of the subject matter described herein.

Referring now to FIG. 6, a schematic diagram of a hovercraft, generally designated 70 is shown. Hovercraft 70 can comprise multiple pieces of rotating machinery or equipment such as propellers P and lift fans F. Lift fans may not be visible in this view; however, several lift fans F are indicated schematically. In some aspects, hovercraft 70 can comprise three controllers and ten pieces of rotating equipment (e.g., two propellers P+eight lift fans F). Notably, each piece of rotating equipment can include sensor(s) and at least one balancer denoted SB which can send and receive information from respective controllers for balancing the rotating equipment.

In some aspects, controllers can communicate with each other (e.g., FIG. 2) such that balancing multiple machines (e.g., fans F and propellers P) is not performed at the same time. Notably, the controllers can simultaneously receive vibration information from multiple pieces of rotating equipment, calculate a beat cycle or beating period, and interpolate or apply rules to obtain an average vibration per machine, such that interference from cross-talk, beating, and noise is minimized or removed. The average value can then be used in generating a balancing command to send to the respective machine. In some aspects, the average value can be obtained and the machine can be balanced in less than one beating period or beat cycle. Each machine can be balanced one at a time. In some aspects, the machine having the highest vibration can be balanced first.

Notably, devices, systems, and methods described herein can provide improved vibration correction, in part, by implementing improved algorithms adapted to determine average vibration either by interpolation or by application of rules based upon the duration of a beat cycle. Thus, balancers and/or balancing systems can provide more effective and efficient balancing. This can improve the performance of and/or reduce maintenance costs associated with replacing closely coupled rotating machinery, or portions thereof. Embodiments disclosed herein can, for example and without limitation, provide one or more of the following beneficial technical effects: reduced balancing times; more efficient balancing; more effective balancing; lower vibration levels; reduced balancing cycles.

While the present subject matter has been has been described herein in reference to specific aspects, features, and illustrative embodiments, it will be appreciated that the utility of the subject matter herein is not thus limited, but rather extends to and encompasses numerous other variations, modifications and alternative embodiments, as will suggest themselves to those of ordinary skill in the field of the present subject matter, based on the disclosure herein. Various combinations and sub-combinations of the structures and features described herein are contemplated and will be apparent to a skilled person having knowledge of this disclosure. Any of the various features and elements as disclosed herein may be combined with one or more other disclosed features and elements unless indicated to the contrary herein. Correspondingly, the subject matter herein as hereinafter claimed is intended to be broadly construed and interpreted, as including all such variations, modifications and alternative embodiments, within its scope and including equivalents of the claims.

What is claimed is:

1. A device for balancing coupled rotating machinery, the device comprising:
   a first interface for receiving vibration information from multiple rotating machines;
   a controller having a correction generation module configured to calculate a beating period or a beating cycle from the vibration information received from the multiple rotating machines; and
   a second interface for sending a balance correction command to a balancer associated with a first rotating machine of the multiple rotating machines;
   wherein the balance correction command is derived in part using an average vibration derived from one or more rules applied based upon the duration of the beating period or the beating cycle;
   wherein a first rule of the one or more rules is applied when the beating period or the beating cycle is less than about 0.5 seconds;
   wherein a second rule of the one or more rules is applied when the beating period or the beating cycle is between about 0.5 seconds and about 3 seconds;
   wherein a third rule of the one or more rules is applied when the beating period or the beating cycle is between about 3 seconds and about 10 seconds; and
   wherein a fourth rule of the one or more rules is applied when the beating period is longer than about 10 seconds
   wherein the device corrects the balancer based on the correction command.

2. The device according to claim 1, wherein the vibration information is received from multiple sensors.

3. The device according to claim 2, wherein the sensors comprise at least one tachometer.

4. The device according to claim 1, wherein the correction generation module is configured to demodulate a complex vibration calculated from the vibration information from the multiple rotating machines.

5. The device according to claim 1, wherein the device communicates with at least two balancers.

6. The device according to claim 1, wherein the device communicates with at least four balancers.

7. The device according to claim 1, wherein the device is disposed in a hovercraft.

8. A system for balancing coupled rotating machinery, the system comprising:

a first piece of rotating machinery rotating at a first speed;

a second piece of rotating machinery rotating at a second speed, that is different than the first speed, such that together the first and second speeds result in a complex vibration; and a controller configured to determine an average vibration of the first piece of rotating machinery;

wherein the controller is configured to interpolate the average vibration of the first piece of rotating machinery from the complex vibration in less than one beating period and by estimating at two or more points along a demodulated complex vibration;

wherein the controller determines a balance correction command based on the interpolated average vibration; and the controller controls the first piece of rotating machinery or the second piece of rotating machinery based on the balance correction command.

9. The system according to claim 8, wherein the controller is configured to interpolate the average vibration of the first piece of rotating machinery from the complex vibration in less than one-half of the beating period.

10. The system according to claim 8, wherein the controller is configured to estimate the average vibration of the first piece of rotating machinery at the intersection of perpendicular bisectors of each of the two or more points.

11. The system according to claim 8, wherein the system comprises multiple controllers, and wherein the multiple controllers communicate with each other.

12. The system according to claim 8, further comprising a first balancer for balancing the first piece of rotating machinery.

13. The system according to claim 8, further comprising a second balancer for balancing the second piece of rotating machinery.

14. The system according to claim 8, wherein the machinery having the highest vibration is balanced first.

15. A method of providing active vibration control within an aircraft, the method comprising:
   receiving vibration data from at least a first rotating machine and a second rotating machine;
   comparing the vibration data and determining a duration of a beat cycle;
   applying rules based upon the duration of the beat cycle, wherein the step of applying rules comprises;
     applying a first rule when the beating period or the beating cycle is less than about 0.5 seconds;
     applying a second rule when the beating period or the beating cycle is between about 0.5 seconds and about 3 seconds;
     applying a third rule when the beating period or the beating cycle is between about 3 seconds and about 10 seconds;
     applying a fourth rule when the beating period is longer than about 10 seconds; and
   sending a balance correction command to the first rotating machine or the second rotation machine
   determining a balance correction command based on the step of applying rules; and
   controlling the first rotating machine or the second rotating machine based on the correction command.

16. The method according to claim 15, wherein receiving the vibration data comprises receiving information from one or more accelerometers or one or more tachometers.

17. The method according to claim 15, further comprising balancing the machinery having the highest vibration first.

18. A method of providing active vibration control within an aircraft, the method comprising:
   receiving vibration data from at least a first rotating machine and a second rotating machine;
   determining a beating period from the vibration data;
   estimating properties of a demodulated complex vibration during the beating period; interpolating an average vibration of at least the first or second rotating machine, wherein interpolating the average vibration comprises estimating two or more points along the demodulated complex vibration; and
   sending a balance correction command to the first rotating machine or the second rotation machine;
   determining a balance correction command based on the interpolated average vibration; and
   controlling the first rotating machine or the second rotating machine based on the correction command.

19. The method according to claim 18, further comprising balancing the machinery having the highest vibration first.

20. The method according to claim 18, wherein interpolating the average vibration occurs in less than one beating period.

21. The method according to claim 18, wherein interpolating the average vibration occurs in less than one-half of the beating period.

22. The method according to claim 18, wherein interpolating the average vibration comprises estimating an intersection of perpendicular bisectors of each of the two or more points.

23. The method according to claim 18, further comprising providing multiple controllers, wherein the multiple controllers communicate with each other.

24. A method of providing active vibration control within an aircraft, the method comprising:
   receiving vibration data from at least a first rotating machine and a second rotating machine;
   determining a beating period from the vibration data;
   estimating properties of a demodulated complex vibration during the beating period;
   interpolating an average vibration of at least the first or second rotating machine, wherein interpolating the average vibration comprises estimating an intersection of perpendicular bisectors of each of two or more points along the demodulated complex vibration; and
   sending a balance correction command to the first rotating machine or the second rotation machine
   determining a balance correction command based on the interpolated average vibration;
   controlling the first rotating machine or the second rotating machine based on the correction command.

* * * * *